(12) United States Patent
Voelchert et al.

(10) Patent No.: US 12,342,903 B2
(45) Date of Patent: Jul. 1, 2025

(54) METHOD FOR PRODUCING A TEXTILE MATERIAL

(71) Applicant: ON CLOUDS GMBH, Zürich (CH)

(72) Inventors: Johannes Voelchert, Zürich (CH); Nils Arne Altrogge, Zumikon (CH); Martin Rüegg, Zürich (CH)

(73) Assignee: ON CLOUDS GMBH, Zürich (CH)

( * ) Notice: Subject to any disclaimer, the term of this patent is extended or adjusted under 35 U.S.C. 154(b) by 130 days.

(21) Appl. No.: 18/028,399

(22) PCT Filed: Sep. 29, 2021

(86) PCT No.: PCT/EP2021/076857
§ 371 (c)(1),
(2) Date: Mar. 24, 2023

(87) PCT Pub. No.: WO2022/069583
PCT Pub. Date: Apr. 7, 2022

(65) Prior Publication Data
US 2024/0049837 A1 Feb. 15, 2024

(30) Foreign Application Priority Data
Sep. 30, 2020 (CH) ..................................... 1239/20

(51) Int. Cl.
*A43B 23/02* (2006.01)
*A43B 1/02* (2022.01)
*B29D 35/12* (2010.01)

(52) U.S. Cl.
CPC ............ *A43B 23/0245* (2013.01); *A43B 1/02* (2013.01); *B29D 35/126* (2013.01)

(58) Field of Classification Search
CPC ........ A43B 23/024; A43B 1/02; B29D 35/126
See application file for complete search history.

(56) References Cited

U.S. PATENT DOCUMENTS 10,051,918 B2 * 8/2018 Dombrow .......... A43B 23/0255
10,159,297 B2 * 12/2018 Jamison ............... A43B 23/042
10,455,896 B2 * 10/2019 Sterman ................ A43B 7/085
(Continued)

FOREIGN PATENT DOCUMENTS

WO WO 2017/083013 A1 5/2017

OTHER PUBLICATIONS

EPO (Rijswijk, NL), English language version of the International Search Report, Form PCT/ISA/210, for International Application PCT/EP2021/076857, Jan. 19, 2022 (2 pages).

*Primary Examiner* — F Griffin Hall
(74) *Attorney, Agent, or Firm* — Pauley Erickson & Swanson

(57) ABSTRACT

A method for producing a textile material, in particular a shoe upper, including the steps of: providing a shaping support, in particular a last; melting a polymer composition at a first temperature; applying the molten polymer composition to the shaping support. The molten polymer composition is applied to the shaping support by a nozzle which has an outlet opening for the molten polymer composition and a plurality of air exit openings which are provided around the outlet opening and from which compressed air is supplied to the exiting polymer composition in such a way that the molten polymer composition which has exited from the nozzle is applied as a helical filament to the shaping support.

17 Claims, 2 Drawing Sheets

(56) References Cited

U.S. PATENT DOCUMENTS

| | | | |
|---|---|---|---|
| 10,471,671 B2* | 11/2019 | Waatti | B29C 64/118 |
| 10,582,741 B2* | 3/2020 | Dombrow | A43C 1/04 |
| 10,932,515 B2* | 3/2021 | Busbee | B33Y 50/02 |
| 2009/0094858 A1 | 4/2009 | Ungari et al. | |
| 2013/0255103 A1* | 10/2013 | Dua | A43B 23/0255 |
| | | | 428/57 |
| 2014/0020192 A1* | 1/2014 | Jones | A43B 13/14 |
| | | | 12/146 B |
| 2015/0040428 A1* | 2/2015 | Davis | A43B 13/12 |
| | | | 12/146 B |
| 2018/0339445 A1* | 11/2018 | Loveder | A43B 23/0245 |
| 2019/0029369 A1* | 1/2019 | VanWagnen | B33Y 80/00 |
| 2019/0246741 A1* | 8/2019 | Busbee | A43B 23/0215 |
| 2020/0221811 A1* | 7/2020 | Isse | B29D 35/122 |
| 2021/0112926 A1* | 4/2021 | Bessho | A43B 23/0215 |

* cited by examiner

METHOD FOR PRODUCING A TEXTILE MATERIAL

CROSS REFERENCE TO RELATED APPLICATION

This application is a National Phase filing in the United States, under 35 USC § 371, of PCT International Patent Application PCT/EP2021/076857, filed on 29 Sep. 2021 which claims the priority of Swiss Patent Application CH 01239/20, filed on 30 Sep. 2020.

The above-referenced applications are hereby incorporated by reference herein in their entirety and is made a part hereof, including but not limited to those portions which specifically appear hereinafter.

BACKGROUND OF THE INVENTION

Field of the Invention

The present invention relates to the field of shoe production, in particular production of a textile material, in particular of a shoe upper, and relates to a method for producing such a textile material, and a textile material produced with this method.

Discussion of Related Art

Many methods for producing textile materials are known in the prior art. Shoe uppers in particular are typically made from traditionally produced textile material. Traditionally, shoe uppers are knitted and then joined to a sole. In this process, the properties of the knitted textile material may be influenced by the choice made regarding knitting technique or lapping.

In addition, solid shoe uppers, are used for example in hard shell shoes, such as ski boots, ice skating boots etc., can be made in a casting process, e.g., by injection moulding, or also by additive manufacturing, respectively 3D printing. The advantage of 3D-printed shoe uppers consists in that the shoe uppers can be adapted individually to the particularities of the runner's foot, in particular the contour of the foot.

SUMMARY OF THE INVENTION

For shoes with soft textile shoe uppers, in particular those made from fibrous materials, as they are typically used in sports shoes, running shoes and everyday shoes, additive manufacturing continues to present several problems. This is mainly because additive production of knitted or woven items often results in the printed fibers being stuck together, and consequently it is not possible to obtain the same properties, particularly in terms of flexibility, as in the traditional textile engineering production methods such as knitting or weaving.

As an alternative to 3D printing, particularly the FDM method, the Melt Blown process is also used to produce textile materials. However, only nonwovens can be manufactured with the Melt Blown process, it is not possible to produce regularly formed, particularly mesh-like or loop-like textile materials with the Melt Blown process.

Compared with traditional textile engineering production methods, additive manufacturing of the textile material has the advantage that sections of the textile can be constructed differently without significantly greater efforts. For example, a fiber produced by 3D printing may have a larger diameter in some regions than in others, e.g., in order to strengthen certain areas selectively. In contrast, it is not readily possible in traditional production to use a yarn which has a greater diameter in the desired regions of the textile than in other regions. Moreover, with additive manufacturing it is possible to recreate different lapping patterns and mesh widths. Thus, for example, one subregion of a textile may be configured as a knit, while another subregion is configured as a woven. This is practically not possible with traditional textile production methods. Furthermore, traditional textile production methods are normally associated with significant amounts of cuttings, which is detrimental to the sustainability of such methods.

The general problem addressed by the invention is to advance the prior art of methods for producing textile materials, in particular shoe uppers. In advantageous embodiments, a method is provided that fully or partially overcomes the drawbacks of the methods known in the prior art. In further advantageous embodiments, a method is provided with which shoe uppers may be produced in a shorter time, adapted in particular individually to the foot of the runner. In particular, in some advantageous embodiments, a method is provided which makes it possible to flexibly produce a loop-like or mesh-like textile material, preferably substantially continuously and in uniform orientation. Mesh-like or loop-like textile material includes not only materials produced traditionally by weaving and knitting, but also such materials having been manufactured by additive manufacturing. This also includes, e.g., at least partially layered coils of a filament which recreate a loop-like or mesh-like material.

The general problem is solved by the objects of the independent claims. Further advantageous embodiments follow from the dependent claims, as well as from the description and drawings.

In one aspect, the present invention relates to a method for producing a textile material, in particular a shoe upper comprising the steps of: providing a shaping carrier, in particular a last; melting a polymer composition at a first temperature; application of the molten polymer composition to the shaping carrier. In this context, the molten polymer composition is applied to the shaping carrier by means of a nozzle, which comprises an outlet opening for the molten polymer composition and a plurality of air exit openings arranged around the outlet opening, from which compressed air impinges on the exiting polymer composition such that the molten polymer composition which has exited the nozzle is applied to the shaping carrier as a helical filament. This means that the filament is at least between the outlet opening and the carrier in the form of a helical filament, or is in the form of a helical filament at least in a subregion between the outlet opening and the carrier. As a consequence, a loop-like textile material comprising the polymer composition forms on the shaping carrier. In this context, a loop-like textile material may comprise a plurality of intersecting, but preferably not entangling, coils or loops. Compared with a non-woven, the shoe upper therefore has one or more regularly arranged filaments. By preselecting the characteristics of the helix, in particular the pitch, the lead, the lead angle and the radius of the helix, the properties of the produced textile material may then be varied and adjusted selectively and at any predefined point in time. For example, a very small radius creates a region in the textile material with very tight loops or coils, and consequently to lower elasticity and higher stability, such as is needed for example in areas that are exposed to high mechanical loads. Selection of a larger radius of the helical filament creates a region in the textile material with larger loops or coils, which results in greater elasticity in this region. The helical filament may have a constant or varying radius in the direction of the shaping carrier. In particular, the radius of the helix may increase from the outlet opening towards the shaping carrier, preferably constantly. The person skilled in the art understands that the shape of such a helix may be described for example by a cone surface, and the path of the filament from the outlet opening to the shaping carrier may thus be substantially conical. In particular, the shape of the helix may be described by the surface of a cone having an opening angle greater than 5°, particularly greater than 10°, more particularly greater than 15°. The opening angle of the cone may preferably be between 5° and 25°, particularly between 10° and 20°. A further advantage of the invention is that with this method it is possible to produce a textile material, particularly a shoe upper, within a much shorter process time. For example, in this way it is possible to produce an entire shoe upper in only 1.5 minutes. Amongst others, because of this very short process time, it is therefore possible to significantly reduce the energy consumption per unit of textile material produced, in particular per shoe upper. In particular, just 0.035 to 0.06 kWh is required to produce a shoe upper.

For the purpose of the present disclosure, a shoe upper refers to a shoe upper which is configured as a textile, and is therefore of softer, more flexible construction as compared to a hard shell shoe upper. Shoe uppers of such kind constructed from a textile are known for example from sports shoes such as tennis or running shoes.

A helical filament may typically include a helix with a minimum radius of 0.5 mm, preferably 1 mm, in particular 2 mm. The radius of the helix may for example be 0.5 mm to 20 mm, particularly 1 mm to 10 mm. The selection of the helix radius of the helical filament directly influences the mesh-size of the textile material. For example, the radius of the helix of the helical element may be substantially equal to the mesh size, of the radius of the loops, in the textile material. The smaller the radius of the helix, the narrower the mesh of the textile material is. In this context, the radius may be constant and/or it may be varied intermittently during the application. This may be achieved for example by controlling the compressed air coming out of the air exit openings which impinges on the polymer composition that has exited the outlet opening. The radius of the helix of the helical element upon contact with the shaping carrier may also be adjusted by varying the distance between nozzle, respectively the outlet opening, and the shaping carrier.

The person skilled in the art also understands that the selection of the first temperature depends on the melting point, or the melting range of the polymer composition, and it is typically chosen such that the polymer composition is melted and is sufficiently viscous to be applied to the shaping carrier by means of the nozzle. The first temperature may also comprise a temperature range. For example, if a thermoplastic polyurethane, such as Desmopan 2790a® or Desmopan 9392A® (Covestro) is used as the polymer composition, the first temperature may have a value for example from 210 to 240° C., in particular 210 to 220° C.

The molten polymer composition is typically pressed through the outlet opening out of the nozzle under pressure. This pressure may be provided for example by an extruder or a pump, in particular a gear pump. The use of a separate pump, in particular a gear pump, is preferable, since this enables better control of the pressure.

The polymer composition may be applied directly and/or also indirectly to the shaping carrier. The application may be considered as indirect when a plurality of layers of the helical filament, or the helical filaments, are applied. In this case, it is possible that only the first filament applied, or the first layer, is in direct contact with the shaping carrier.

Typically, only a single filament exits from the nozzle, not several filaments at the same time.

In addition, in some embodiments the helical filament is applied at least intermittently, or also entirely, as a continuous filament. The textile material produced then comprises a plurality of continuous loops or coils which consist of a single, continuous filament. Thus, such a textile material is not a non-woven. After a predetermined number of coils or loops have been applied, the application and therewith also the filament may be interrupted, and resumed at a different position on the shaping carrier.

The air exit openings are typically circularly arranged around the outlet opening of the nozzle. The air exit openings are orientated with a horizontal angle β between a horizontal plane formed perpendicularly to the outlet opening and the discharge direction, and an air exit opening, respectively along an axis through an air exit opening in the flow direction of the compressed air, between 40° and 60°, preferably between 50° and 60°, in particular 55°. Moreover, the exit openings along an axis through the corresponding air exit opening in the flow direction of the compressed air are not directed directly on an axis extending in the discharge direction through the central point of the outlet opening, but are rather offset horizontally thereto, i.e., perpendicularly to the discharge direction and the outlet opening, by an angle α. Angle α may preferably be between 5° and 35°, particularly between 15° and 30°. For example, a curling nozzle no. 185147 from Robatech may be used.

The shaping carrier may for example be a last. This may be produced in a first step on the basis of a 3D model of the wearer's foot. For this, a wearer's foot may be measured, and a 3D model thereof created on the basis thereof. This results in the production of an individual shoe upper adapted to the foot of the runner. In addition, the shaping carrier can be the runner's foot itself. In this case, the shoe upper is applied directly to the foot. Since the first temperature may under certain circumstances be high, the foot may accordingly be covered with a layer of heat insulating material before the polymer composition is applied. This material may be designed so that it can be peeled off, dissolved or removed, so that in a final step it can be detached from the shoe upper without destroying the shoe upper itself. In alternative embodiments, the shaping carrier may be a model of a backpack or a bag. The shaping carrier may also be a plate.

In some embodiments, the shaping carrier, which may particularly be a last, includes heating elements, respectively it is heatable. The advantage of this is that the textile material produced can be materially bonded, in particular welded, directly to another element. For example, in some embodiments at least subregions of the carrier may be heated after the application of the molten polymer composition to the heatable shaping carrier, and optionally after the applied polymer composition has cooled and hardened, in such manner that an insole or a midsole may be welded directly to the shoe upper.

In some embodiments, the shaping carrier, in particular the last, may include one or more depressions, in particular grooves or furrows. In this way, it may be possible for additional elements such as textile material, foam material, cushioning material, metal or plastic material to be inserted in the depressions before the molten polymer composition is applied to the shaping carrier. When the molten polymer composition is applied, a material bond is created between the polymer composition and the additional elements. For example, the shaping carrier may be a last, which has one or more depressions in the heel region. An impact-absorbing material may be deposited in these depressions, and arranged in such manner that the heel region of the shoe upper is configured to absorb impacts, or that a heel cushion (also called "heel padding") is formed. Alternatively, it is also possible that no additional elements are inserted in the depression(s), but they are instead completely filled with the polymer composition when the molten polymer composition is applied. This has the effect of strengthening the textile material in predefined regions of the textile material.

In some embodiments, the helical filament that has exited the outlet opening has a filament thickness of 0.01 mm to 0.2 mm, in particular of 0.05 mm to 0.15 mm. This also corresponds to the filament thickness of the filaments in the produced textile material.

In further embodiments, the shaping carrier is moved relative to the nozzle. The movement of the shaping carrier is typically monitored and controlled by a control unit. The shaping carrier may for example be moved in three-dimensional space by means of a positioning unit. The positioning unit is typically monitored and controlled by the control unit. In this context, the control unit may be part of a circuit, a processor, and/or of a computer.

In some embodiments, the nozzle may be arranged to be movable, in particular movable in space. For example, the nozzle may be moved in three-dimensional space and in particular relative to the shaping carrier, by means of a nozzle positioning unit. The nozzle positioning unit is typically monitored and controlled by the control unit. In this context, the control unit may be part of a circuit, a processor, and/or of a computer. In certain embodiments, the nozzle may be moved by means of a nozzle positioning unit, and the shaping carrier may be moved by means of a positioning unit, each independently of each other in the three-dimensional space.

In some embodiments, the shaping carrier is moved with a speed of 1 m/min to 20 m/min, in particular 5 m/min to 15 m/min, relative to the nozzle.

In some embodiments, the compressed air impinges on the heated polymer composition in such manner that the composition passes out of the nozzle as a helical filament. In this way, the helical shape of the filament that has exited the outlet opening can be controlled particularly precisely. The helical shape can also be achieved in other ways, for example by controlled movement of the nozzle itself, but that process may result in uncontrolled severing of the filament, which in turn means that regular, continuous loops cannot be produced from a single filament. For this purpose, the air exit openings are preferably arranged at a predetermined, inclined angle to the longitudinal axis and/or to the horizontal plane to the longitudinal axis of the outlet opening. In particular, the nozzle may have a plurality of air exit openings, in particular at least 5, preferably exactly 6 air exit openings. Preferably, all air exit openings are inclined, or tilted, uniformly with respect to the longitudinal axis.

In further embodiments, the compressed air impinges on the molten polymer composition continuously or discontinuously. In particular, the compressed air may be applied continuously for a certain time period, for example to form the helical filament, and discontinuously for certain time periods, to sever the filament. This may be achieved for example by a sudden, short increase in the pressure of the compressed air coming out of the air exit openings. Afterwards, a further helical filament may then be continuously applied.

The person skilled in the art understands that the term "compressed air" refers to all suitable gases and gas mixtures. However, for reasons of cost the use of ambient air is preferable.

In some embodiments, the compressed air impinges on the heated polymer composition with a pressure of 1.2 to 1.5 bar.

In advantageous embodiments, the compressed air impinging on the molten polymer composition is at a temperature above room temperature (25° C.). In particular, the compressed air may be at a temperature equal to the first temperature. The temperature of the compressed air is preferably in a range from 200° C. to 300° C., in particular 240° C. to 260° C.

In some embodiments, the melting of the polymer composition in step b. is accomplished by means of consecutively arranged temperature zones. In particular, for example, before it exits the nozzle the polymer composition may pass through a first temperature zone, then a second temperature zone with a temperature that is higher than the temperature of the first temperature zone, and then optionally a third temperature zone with a temperature that is higher than the temperatures of the first and second temperature zones. For example, the first temperature of the first temperature zone may be in a range from 180° C. to 185° C., the second temperature of the second temperature zone may be in a range from 230° C. to 235° C., and optionally the third temperature of the third temperature zone may be in a range from >235° C. to 240° C.

In further embodiments, the polymer composition is applied to the shaping carrier as a continuous filament, in such manner that a loop-like textile segment is formed. Additionally, or alternatively, the polymer composition may be applied partially as a discontinuous filament, so that a nonwoven-like textile segment is created. If the polymer composition is applied continuously and discontinuously to various regions of the shaping carrier, the textile material produced includes both nonwoven-like, i.e. unordered, and loop-like and/or mesh-like, i.e. ordered, segments. This is advantageous because unordered segments have different properties, particularly in terms of flexibility, resistance and surface constitution.

In some embodiments, a 3D-model of a foot of a carrier may be created before step b. and optionally before step a. This may for example be accomplished by means of a camera. In such a case, the 3D-model may be entirely or partially computer-generated. The 3D-model may then be stored in a control unit. The control unit may then calculate a lapping pattern based on the 3D-model, according to which the molten polymer composition is applied to the shaping carrier. In this process, it may be recognized that, for example, due to the individual shape of the foot of the carrier, the shoe upper should be strengthened at certain points. The control unit is then able to control the application in step c. in such manner that more layers of the polymer composition are applied to these positions as compared to other positions, thus strengthening those positions.

In some embodiments, the polymer composition may have an adjustable second temperature during the application, particularly upon contact with the shaping carrier. This second temperature may be selected such that the filament applied to the shaping carrier does not form a material bond at intersecting positions of filament segments, or it may be selected such that the filament applied to the shaping carrier does form a material bond at intersecting positions of filament segments, in particular by fusion. Filament segments that are not materially bonded are typically able to move relatively freely and independently with respect to each other. In this way, an advantageous flexibility on the production of the textile material is achieved. A material bond of the loops of the polymer composition applied to the shaping carrier may be created at a predetermined region at any predetermined point in time. The greater the proportion of materially bonded intersecting positions, the less flexible or stretchable a certain region of the produced textile material, in particular of the shoe upper, and accordingly the greater the stability and strength of this region. This can be especially advantageous in regions of the textile material that are subjected to strong mechanical stress, such as the top side of the forefoot region of a shoe upper, which is folded, compressed and stretched during the rollover process. A lower proportion of materially bonded intersecting positions correspondingly increases the flexibility, and stretchability, of the corresponding region of the shoe upper, for example is advantageous in regions of the shoe, which are stretched intensively during running motion because of the anatomical movements. In this context, the second temperature may be selected such that it is lower than the melting temperature, or the melting temperature range by a predefined value, so that material bonding of the filament segments does not occur. If it is intended that material bonding should take place, then the second temperature is selected such that it is substantially at least equal to the melting temperature, or the melting temperature range of the polymer composition, or such that it is only a suitable amount below the melting temperature.

In some embodiments, the second temperature may be set by means of an airflow with predetermined temperature impinging on the polymer composition. This airflow is typically different from the compressed air that exits the air exit openings. In particular, the airflow may be supplied from an air discharge apparatus arranged in the region between the outlet opening of the nozzle and the shaping carrier. Thus, for example, an air discharge apparatus with air nozzles, from which the airflow is discharged at a predetermined temperature in the direction of the helical filament may be disposed along the helical filament after it has exited the outlet opening.

In further embodiments, the polymer composition may comprise or consist of a thermoplastic polymer, in particular polyamide, polyether block amide, polyurethane (thermoplastic polyurethane) and/or polyester. In such a case, low molecular polyurethane or also high molecular polyurethane may preferably be used, wherein high molecular polyurethane generally increases strength, in particular tensile strength. The person skilled in the art is familiar with the melting temperatures of these thermoplastic materials, so he is able to select the first and optionally the second temperature accordingly.

In some embodiments, the distance between the outlet opening and the shaping carrier during application of the molten polymer composition is between 20 mm and 110 mm, in particular between 40 mm and 60 mm. The distance may be varied within these ranges during application, or also kept constant throughout the entire application process.

In further embodiments, the textile material is a shoe upper, and the shoe upper produced is joined to a sole to make a shoe, in particular a running shoe. Alternatively, the shoe upper may be joined to a sole directly during the application. In this case, for example, the sole may already be detachably connected with the shaping carrier. After completing the production of the shoe upper, the shaping carrier may be removed, thus producing a shoe, in particular a running shoe.

In some embodiments, the method for producing a textile material, in particular the shoe upper, is performed using a discharge apparatus that comprises a pump, in particular a gear pump, a pump drive, a dosing head and the nozzle with the outlet opening and the air exit openings arranged around the outlet opening as disclosed herein, and a melting apparatus. The discharge apparatus may also include an air discharge apparatus, from which an airflow at a predetermined temperature may impinge on the helical filament that has exited the outlet opening of the nozzle to set the second temperature. The air discharge apparatus may preferably be equipped with air nozzles. The melting apparatus may include a plurality of, in particular three, consecutively arranged temperature zones. Each temperature zone may have a separately controllable heating element. In particular, before it exits the nozzle, the polymer composition may for example pass through a first temperature zone, then a second temperature zone with a temperature that is higher than the temperature of the first temperature zone, and then optionally a third temperature zone with a temperature that is higher than the temperatures of the first and second temperature zones. For example, the first temperature of the first temperature zone may be in a range from 180° C. to 185° C., the second temperature of the second temperature zone may be in a range from 230° C. to 235° C., and optionally the third temperature of the third temperature zone may be in a range from >235° C. to 240° C.

In some embodiments, the melting apparatus may include an extruder with a drum, and a screw arranged therein. The melting apparatus may further have heating elements for setting the first temperature. If an extruder is used, the extruder does not typically determine the pressure with which the polymer composition exits the outlet opening. The pressure with which the polymer composition exits the outlet opening is typically provided and controlled by the pump, in particular a gear pump, since this allows a significantly more precise adjustment and control of the pressure. The pressure exerted by the pump may particularly be between 40 and 60 bar.

A further aspect of the invention relates to an article of apparel, in particular a shoe, comprising a textile material, in particular a shoe upper, produced with a method according to any of the embodiments disclosed herein. Such an article of apparel, in particular a shoe upper, includes a loop-like textile material. This may have a plurality of substantially regularly constructed coils. A plurality of coils, respectively loops, are preferably made from a single filament. Filament segments may cross each other at intersecting positions. The filament segments may be materially bonded to each other and/or not materially bonded to each other at the intersecting positions. The loop-like textile material preferably comprises at least one intersecting position at which filament segments, in particular filament segments of the same filament, are materially bonded. The coils, respectively loops, are preferably substantially circular or elliptical in shape. A shoe upper which has been produced according to a method of one of the embodiments disclosed here does not typically form a continuous surface, instead it is mesh-like, that is to say it has a certain porosity.

A further aspect is a discharge apparatus for carrying out the method according to one of the embodiments disclosed herein. The discharge apparatus comprises a dosing head which is in fluid communication with a melting apparatus and with a separate dosing pump. The melting apparatus comprises an extruder, which typically has a drum, and a screw arranged therein. The discharge apparatus further includes a separate dosing pump, which is in fluid communication with the dosing head. The dosing head has a nozzle comprising an outlet which is in fluid communication with the dosing head, and a plurality of air exit openings arranged around the outlet opening. The air exit openings are arranged such that compressed air can be impinged on a molten polymer composition that has exited the outlet opening such that the molten polymer composition which has exited the outlet opening is applied to a shaping carrier in the form of a helical filament. The extruder has the advantage that the polymer composition is freshly melted directly in the required quantity in each case, and is not kept constantly in a molten state in a melting apparatus such as a heatable tank or the like. If the polymer composition is kept in the molten state for a prolonged period, the quality of the polymer deteriorates substantially, as the polymer is partly degenerated. Quality, particularly the stability of the filament, is very important in the production of the textile material. The combination of the dosing head with an extruder allows to only melt the quantity of polymer composition that is required at the time, thereby avoiding degeneration of the polymer composition and the associated loss of stability.

In this context, the melting apparatus may include a plurality of, in particular three, consecutively arranged temperature zones. Each temperature zone may include a separately controllable heating element. In particular, for example, before it exits the nozzle the polymer composition may pass through a first temperature zone, then a second temperature zone with a temperature that is higher than the temperature of the first temperature zone, and then optionally a third temperature zone with a temperature that is higher than the temperatures of the first and second temperature zones. For example, the first temperature of the first temperature zone may be in a range from 180° C. to 185° C., the second temperature of the second temperature zone may be in a range from 230° C. to 235° C., and optionally the third temperature of the third temperature zone may be in a range from >235° C. to 240° C.

The dosing pump is a pump that is separate from the extruder. It would be possible for the polymer composition to be discharged from the outlet opening onto a shaping carrier with the aid of the extruder alone, but it is important for the production of a textile material which has a mesh-like construction and comprises a single filament over a plurality of mesh structures and coils, that the discharge pressure can be precisely controlled, which is not possible to a sufficient degree with an extruder. The separate pump therefore serves to fine-tune the pressure with which the molten polymer composition is discharged. The dosing pump is preferably a gear pump. The discharge apparatus may further include a motor for driving the dosing pump.

In some embodiments, the nozzle comprises at least 2, at least 3, at least 4, at least 5, at least 6, particularly 6, air exit openings. The air exit openings may be arranged concentrically and equidistantly from each other around the outlet opening.

In further embodiments, the air exit openings are not directed directly towards the outlet opening of the nozzle. In such embodiments, the air exit openings along an axis through the corresponding air exit opening in the flow direction of the compressed air are not directed directly towards an axis extending in the discharge direction through the central point of the outlet opening, but are rather offset horizontally thereto, i.e., perpendicularly to the discharge direction and the outlet opening, by an angle α. Angle α may preferably be between 5° and 35°, particularly between 15° and 30°. Among others, this allows to apply the filament to a shaping carrier in a helical form. The air exit openings may for example generally be linear channels.

In some embodiments, a horizontal angle β between a horizontal plane, which is formed perpendicularly to the outlet opening and the discharge direction, and an air exit opening, respectively along an axis through an air exit opening in the flow direction of the compressed air, is between 40° and 60°, preferably between 50° and 60°, in particular 55°.

In further embodiments, the discharge apparatus further comprises an air discharge apparatus, which is configured to impinge an airflow at predetermined temperature on the filament which is in helical form after exiting the outlet opening of the nozzle for setting the second temperature of the exited polymer composition.

BRIEF DESCRIPTION OF SEVERAL VIEWS OF THE DRAWINGS

Aspects of the invention are explained in more detail with reference to the embodiments shown in the following figures and the accompanying description.

DETAILED DESCRIPTION OF THE INVENTION

Figure 1:
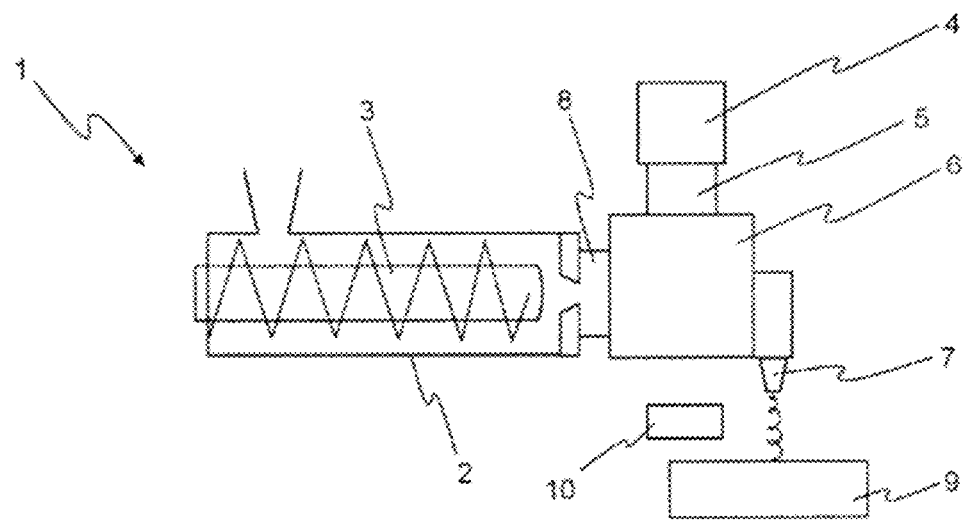
FIG. 1 shows a discharge apparatus for performing the method according to the invention.

FIG. 1 shows a discharge apparatus 1 for performing the method according to the invention. The discharge apparatus 1 comprises an extruder with drum 2 with an inlet opening, and screw 3 as the melting apparatus in which the polymer composition is melted. An adapter 8 adjoins the extruder. The discharge apparatus further comprises a dosing pump 5 with drive 4, and a dosing head 6 and nozzle 7 with an outlet opening and air exit openings arranged around the outlet opening, from which a helical filament is applied to the shaping carrier 9. The discharge apparatus also comprises an air discharge apparatus 10, from which an airflow at a predetermined temperature may impinge on the filament which is in helical form after exiting the outlet opening of the nozzle in order to set the second temperature.

Figure 2:
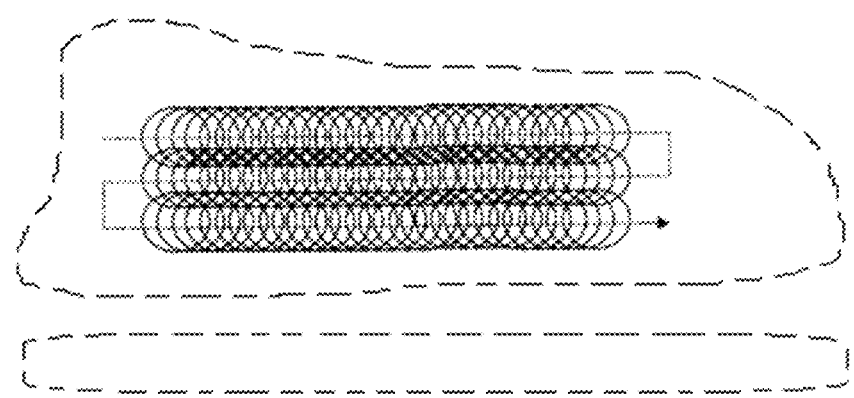
FIG. 2 shows a regularly formed textile material having been produced by the method.

FIG. 2 shows a regularly formed textile material having been produced by the method according to the invention, and which may form part of a shoe upper. Due to the helical form of the filament exiting the outlet opening, the textile material comprises regular filament segments which intersect each other at intersecting positions, and which form circular coils. Depending on the setting of the second temperature, the filament segments may either be materially bonded or not materially bonded at the intersecting positions. During production, the textile material may be manufactured in the direction indicated by the dashed arrow.

Figure 3:
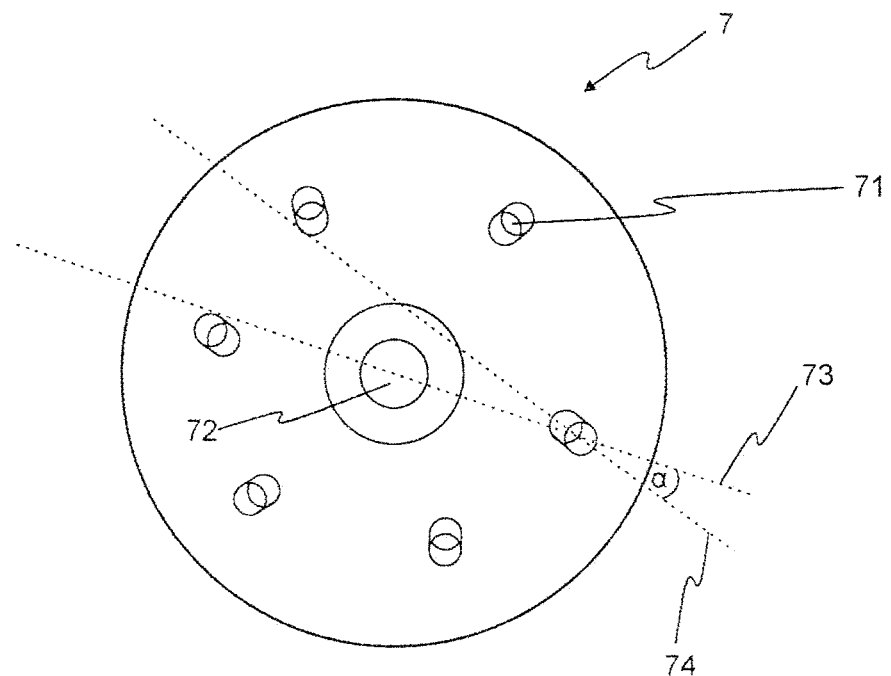
FIG. 3 shows a schematic plan view of a nozzle as it is being used in a discharge apparatus.

FIG. 3 is a schematic plan view of a nozzle 7 as it is being used in a discharge apparatus in the method according to the invention. As depicted in FIG. 3, the air exit openings are not directed directly onto the outlet opening of the nozzle. The nozzle 7 comprises six such air exit openings 71 (to allow a clearer representation, only one of the air exit openings is referenced). These are along axis 74 through the corresponding air exit opening in the flow direction of the compressed air, not directed directly onto an axis 73 extending in the discharge direction through the central point of the outlet opening, but are rather offset horizontally thereto, i.e., perpendicularly to the discharge direction and the outlet opening, by an angle α. Angle α along the air exit openings, i.e. along an axis 74 through the corresponding air exit opening in the flow direction of the compressed air to an axis 73 which is directed directly onto the outlet opening 72, can be between 5° and 35°, particularly between 15° and 30°.

Figure 4:
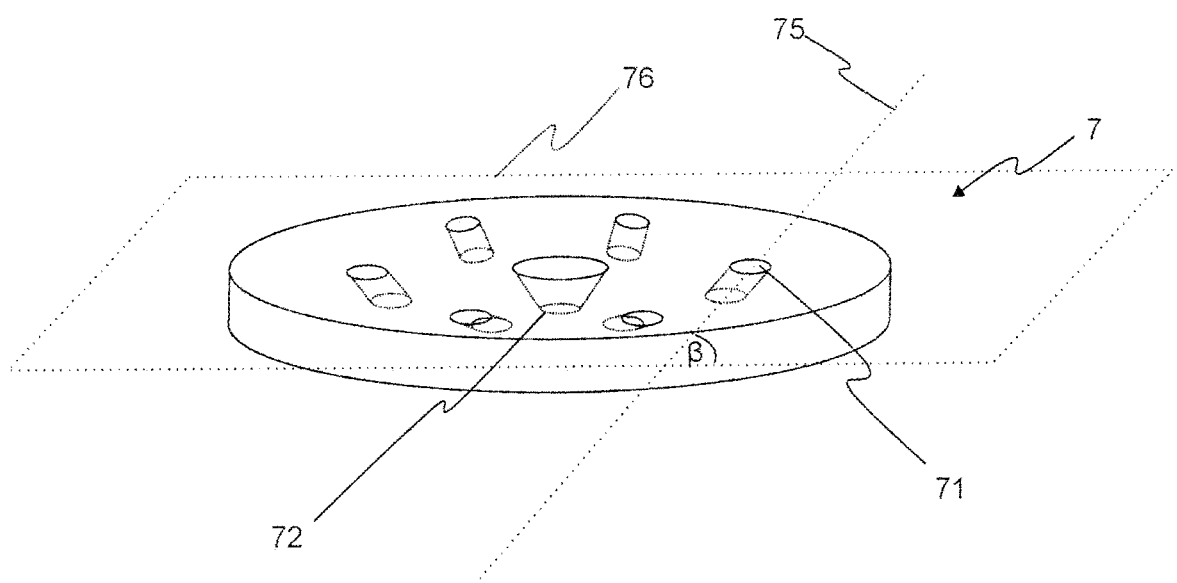
FIG. 4 shows a schematic side view of the nozzle as it is used in a discharge apparatus in the method according to the invention.

FIG. 4 shows a schematic side view of the nozzle 7 as it is used in a discharge apparatus in the method according to the invention. Horizontal angle β between horizontal plane 76, which is perpendicular to the exit direction, and the air exit opening (for the sake of clarity, the direction of the air exit opening 71 is represented by axis 75) is between 40° and 60°, preferably between 50° and 60°, particularly 55°.

The invention claimed is:

1. A method for producing a textile material comprising the steps of:
   a. providing a shaping carrier;
   b. melting a polymer composition at a first temperature;
   c. applying the molten polymer composition to the shaping carrier with a nozzle, wherein the nozzle comprises an outlet opening and a plurality of air exit openings arranged around the outlet opening, from which compressed air impinges on the molten polymer composition such that the molten polymer composition exits the nozzle as a helical filament and is applied to the shaping carrier as the helical filament.

2. The method according to claim 1, wherein the helical filament has a filament thickness of 0.01 mm to 0.2 mm.

3. The method according to claim 1, wherein during the application the shaping carrier is moved relative to the nozzle and/or the nozzle is moved relative to the shaping carrier.

4. The method according to claim 3, wherein the movement of the shaping carrier and/or of the nozzle is controlled by a control unit.

5. The method according to claim 3, wherein the shaping carrier is moved relative to the nozzle with a speed of 1 m/min to 20 m/min.

6. The method according to claim 1, wherein the compressed air from the air outlet openings impinges continuously or discontinuously on the molten polymer composition.

7. The method according to claim 1, wherein the compressed air impinges on the molten polymer composition with a pressure of 1.2 to 1.5 bar.

8. The method according to claim 1, wherein the molten polymer composition is applied to the shaping carrier as a continuous filament, thus creating a loop-like textile segment; and/or wherein the molten polymer composition is applied as a discontinuous filament, thereby creating a nonwoven-like textile segment.

9. The method according to claim 1, wherein during the application the molten polymer composition has a settable, second temperature, which is selected either such that the filament applied to the shaping carrier does not form a material bond at intersecting positions of filament segments, or that the second temperature is selected such that the filament applied to the shaping carrier does form a material bond at intersecting positions of filament segments, in particular by fusion.

10. The method according to claim 9, wherein the second temperature is set by an airflow with predetermined temperature impinging on the molten polymer composition.

11. The method according to claim 1, wherein the molten polymer composition comprises a thermoplastic polymer.

12. The method according to claim 1, wherein the distance between nozzle and shaping carrier is between 20 mm and 110 mm.

13. The method according to claim 1, wherein the textile material produced is a shoe upper and is joined to a sole, or wherein the shoe upper is joined to a sole directly during the application.

14. The method according to claim 1, wherein the shaping carrier comprises a last.

15. A method for producing a textile material comprising the steps of:
   a. providing a shaping carrier;
   b. melting a polymer composition at a first temperature;
   c. applying the molten polymer composition to the shaping carrier with a nozzle, wherein the nozzle comprises an outlet opening wherein the molten polymer composition exits the nozzle as a helical filament formed at least in a subregion between the outlet opening and the shaping carrier.

16. The method of claim 15 wherein the helical filament is formed by moving the nozzle.

17. The method of claim 15 wherein the nozzle comprises a plurality of air exit openings arranged around the outlet opening, from which compressed air impinges on the molten polymer composition such that the helical filament is formed by impingement of the compressed air from the nozzle.

* * * * *